Patented Mar. 14, 1944

2,344,024

UNITED STATES PATENT OFFICE 2,344,024

BROACH AND A METHOD OF PREPARING THE SAME

Bruce Chandler, Waukegan, Ill., and Henry B. Yuen, Montreal, Quebec, Canada, assignors to Pfanstiehl Chemical Company, a corporation of Illinois No Drawing. Application September 25, 1942, Serial No. 459,736

3 Claims. (Cl. 51—309)

This invention relates to an improved broach and a method of preparing the same.

In the manufacture of jeweled bearings the jewel may be broached with a broach comprising diamond dust as its cutting ingredient and after broaching the jewel may be shaped with the same or another broach. These broaches are generally cylindrical in form, having a diameter in the neighborhood of .030–.125 inch, and are not less than ½ of an inch in length.

Diamond dust will not adhere well to other materials, particularly ceramic materials, and in the past the diamond dust broaches have been made by specialists who carefully combined borax and diamond dust. The mixture was rolled and kneaded on a hot plate until an object of the desired shape had been formed and reformed many times. The products so produced were obviously not uniform in strength.

By means of the present invention it has become possible for the first time to produce a diamond dust broach having a ceramic binder. The products of this invention may be made completely uniform in shape and are stronger and more uniform in strength than the previous products. The grinding life of the new product is also greater than the old, even when employing a lower percentage of diamond dust than the old borax type of broach.

In accordance with the present invention, a ceramic material, preferably aluminum oxide ($Al_2O_3$), is thoroughly and intimately admixed with diamond dust, wetted to form a thick paste, extruded from a pressure chamber through a nozzle having a length approximately 10 times its minimum diameter, to form a cylinder, dried and then fired at a firing temperature below the decomposition temperature of the diamond dust and in an inert atmosphere, and then cooled in such an atmosphere until the temperature is low enough to avoid damage in the open air.

In its preferred form the ceramic material of the present invention includes a small proportion of a fluorescent material such as zinc orthosilicate and a ceramic lubricant such as bentonite. The ceramic ingredients may be mixed dry, with or without the diamond dust. After the dry mix, they are wetted, as for example with 95% alcohol and then a wet mix is carried out. It is preferred not to add the diamond dust at this stage because of the expensiveness of the dust. If, for any reason, a batch is spoiled in the earlier stages any great loss is avoided if the diamond dust has not been included.

After the ceramic ingredients have been mixed they are dried at a low temperature and then the diamond dust is mixed with them in a dry state. Here again, after completing a dry mix, a wetting material such as alcohol is added and the products wet mixed. During this stage of the process, or during both mixing stages, the zinc orthosilicate gives a visual indication of the extent and character of the mixing when viewed under ultra violet light.

After the mixing has been completely carried out the material is dried and then a little water is added to make a thick or heavy paste suitable for extrusion. The amount of water required for this purpose depends upon atmospheric and other conditions but can readily be determined by the operator. The paste is then extruded through a nozzle of the desired size or shape. The material is passed into the nozzle from any desired type of pressure chamber. The nozzle is slightly flared at the opening, in accordance with the usual practice, and is flared somewhat more toward the end adjacent the pressure cylinder. As stated before, the total length of the nozzle should be approximately 10 diameters.

The extruded material is cut into rods approximately 1½ inches in length and these are placed in semi-cylindrical grooves in an aluminum plate and are covered with a grooved plate. The grooves are substantially the diameter of the rods.

The rods are dried over night under a low temperature—preferably not above 90° C.—in order to remove the water and impart strength.

The rods or cylinders are then fired. The firing may be carried out on individual cylinders, but preferably a number of broaches are embedded in fine carborundum powder in an alundum crucible, placed in an electric furnace and fired in an inert atmosphere, preferably of hydrogen.

The firing temperature must be carefully selected in order to impart strength to the product while avoiding any decomposition or reversion of the diamond dust.

Firing for one to two hours at 2400° F. is preferred. The temperature may be lowered by increasing the time, and the time may be somewhat diminished by increasing the temperature. However, temperatures markedly above 2400° F. may cause damage to the diamond dust if continued for too long a period. The time and the temperature depend also upon the size of the cylinder and the greater the percentage of diamond dust employed the higher the temperature that is required for suitable strength.

After firing is complete the broaches are cooled in an inert atmosphere to a temperature at which there may be no reaction of the diamond dust and air. Ordinarily this means to a temperature below 1000° F. This operation may be performed by moving the broaches to a cooler portion of the furnace.

The preferred broach is made up of 40 grams of a mixture of 92 parts aluminum oxide and 8 parts zinc orthosilicate, 10 grams of bentonite, and 50 grams of diamond dust. This calculates to a percentage of 3.2 orthosilicate and 36.8 aluminum oxide in the completed product.

In another example 75 parts of the mixture of aluminum oxide and zinc orthosilicate were mixed with 25 parts of diamond dust. This is equivalent to 69% $Al_2O_3$ and 6% zinc orthosilicate.

In another example, 40% of diamond dust was mixed with 55.2% aluminum oxide, 4.8% zinc orthosilicate.

Bentonite, which acts as a lubricant, has proved particularly useful in the manufacture of broaches containing more than forty per cent of diamond dust.

Other ceramic materials may be substituted in part for the $Al_2O_3$. The lubricant may be replaced by other lubricants or may be omitted entirely particularly in connection with lower percentages of diamond dust.

The foregoing detailed description has been given for clearness of understanding only, and no unnecessary limitations should be understood therefrom.

We claim:

1. A fired composition comprising approximately 25% to 50% diamond dust, 36.8% to 75% aluminum oxide, 0% to 10% bentonite and 0% to 6% of zinc orthosilicate, the components being homogeneously distributed throughout the mass and the composition being adapted for use in grinding.

2. A broach comprising a ceramic mass of small cross section, having high structural strength and comprising approximately 25% to 50% diamond dust, 36.8% to 75% aluminum oxide, 0% to 10% bentonite and 0% to 6% of zinc orthosilicate.

3. A broach comprising a ceramic mass of small cross section, having high structural strength and comprising approximately 50% diamond dust, approximately 10% bentonite and approximately 40% of a ceramic binder consisting essentially of aluminum oxide.

BRUCE CHANDLER.
HENRY B. YUEN.